United States Patent
Lutz

(10) Patent No.: US 12,337,493 B2
(45) Date of Patent: Jun. 24, 2025

(54) CUTTING ELEMENT WITH SELF-RESHARPENING CUTTING EDGE

(71) Applicant: Gebrüder Busatis Gesellschaft m.b.H., Purgstall an der Erlauf (AT)

(72) Inventor: Wolfgang Lutz, Wieselburg (AT)

(73) Assignee: Gebrüder Busatis Gesellschaft m.b.H., Purgstall an der Erlauf (AT)

( * ) Notice: Subject to any disclaimer, the term of this patent is extended or adjusted under 35 U.S.C. 154(b) by 868 days.

(21) Appl. No.: 17/478,232

(22) Filed: Sep. 17, 2021

(65) Prior Publication Data

US 2022/0087109 A1    Mar. 24, 2022

(30) Foreign Application Priority Data

Sep. 21, 2020  (AT) .............................. A 50801/2020

(51) Int. Cl.
| | |
|---|---|
| *B26D 1/00* | (2006.01) |
| *A01D 43/08* | (2006.01) |
| *A01F 29/09* | (2010.01) |

(52) U.S. Cl.
CPC ........... *B26D 1/0006* (2013.01); *A01D 43/08* (2013.01); *A01F 29/09* (2013.01); *B26D 2001/002* (2013.01)

(58) Field of Classification Search
CPC ........ B26D 2001/002; B26D 2001/006; B26D 1/0006; B02C 18/18; A01F 29/09; A01F 29/06; A01D 43/08
See application file for complete search history.

(56) References Cited

U.S. PATENT DOCUMENTS

| | | | | |
|---|---|---|---|---|
| 6,857,255 | B1 * | 2/2005 | Wilkey | A01D 34/13 56/296 |
| 7,677,843 | B2 * | 3/2010 | Techel | A01F 29/09 407/119 |

(Continued)

FOREIGN PATENT DOCUMENTS

| | | | | |
|---|---|---|---|---|
| AT | 15071 | U1 * | 10/2016 | ............ A01D 43/10 |
| AT | 519562 | B1 * | 8/2018 | ............ A01D 34/73 |

(Continued)

OTHER PUBLICATIONS

Austrian Office Action dated Jun. 24, 2021 of Application No. 1A A 50801/2020-1.

*Primary Examiner* — Arpad Fabian-Kovacs
(74) *Attorney, Agent, or Firm* — Gordon & Jacobson, P.C.

(57) ABSTRACT

A cutting element, in particular for abrasive cut material, is provided that includes a substrate that defines at least one cutting wedge which is formed by first and second wedge surfaces that intersect along a wedge edge. A cutting layer that extends over the first wedge surface and defines a cutting edge which lies on the wedge edge when new. The wear resistance of the cutting layer is greater than wear resistance of the substrate. The cutting layer is configured to define a blade-shaped protrusion that projects beyond the wedge edge due to wear of the substrate in the area of the second wedge surface to provide a self-resharpening cutting edge. The cutting layer or part thereof is formed by means of melt-metallurgical modification of an edge zone of the substrate by in-situ precipitation of finely dispersed inherent hard phases from partial melting of the edge zone of the substrate.

22 Claims, 2 Drawing Sheets

(56) References Cited

U.S. PATENT DOCUMENTS

| | | | | |
|---|---|---|---|---|
| 2013/0233145 | A1* | 9/2013 | Sotelo | B21K 11/00 |
| | | | | 83/835 |
| 2014/0045562 | A1* | 2/2014 | Adamczyk | A01F 29/02 |
| | | | | 427/256 |
| 2015/0319923 | A1* | 11/2015 | Stoffel | A01D 34/661 |
| | | | | 427/596 |
| 2016/0073582 | A1* | 3/2016 | Stoffel | B23K 26/34 |
| | | | | 219/76.1 |
| 2016/0157423 | A1* | 6/2016 | Stoffel | A01D 34/73 |
| | | | | 219/76.1 |
| 2016/0309648 | A1* | 10/2016 | Stoffel | B23K 26/0006 |
| 2017/0203300 | A1 | 7/2017 | Kroell et al. | |
| 2018/0098479 | A1* | 4/2018 | Groves | A01B 23/06 |
| 2019/0281760 | A1* | 9/2019 | Mayerle | A01D 34/73 |

FOREIGN PATENT DOCUMENTS

| | | | | |
|---|---|---|---|---|
| DE | 202006017540 | U1 | 3/2007 | |
| DE | 102017201160 | A1 | 7/2017 | |
| DE | 102016112577 | A1 | 1/2018 | |
| DE | 202020104515 | U1 * | 11/2020 | A01D 34/73 |
| EP | 0875323 | A2 | 11/1998 | |
| EP | 0878123 | A2 * | 11/1998 | A01F 29/095 |
| EP | 2786651 | A1 | 10/2014 | |
| EP | 3165284 | B1 * | 7/2021 | A01D 43/10 |

* cited by examiner

CUTTING ELEMENT WITH SELF-RESHARPENING CUTTING EDGE

CROSS-REFERENCE TO RELATED APPLICATION(S)

The present disclosure claims priority from Austrian Patent Appl. No. A50801/2020, filed on Sep. 21, 2020, herein incorporated by reference in its entirety.

BACKGROUND

1. Field

The present disclosure relates to cutting elements using abrasive cut material.

2. State of the Art

Cutting elements are used for cutting or crushing agricultural goods, for example as a blade for chopping drums in forage harvesters. For crushing agricultural goods such as grass, alfalfa, corn, millet and the like, the forage harvesters can employ blades that are attached to a rotating chopping drum and led past a fixed counter-blade. The agricultural goods are crushed between the revolving blades and the fixed counter-blade. Such chopping drums for forage harvesters are known from documents DE102016112577A1 and DE102017201160A1, for example.

Blades currently on the market for chopping drums of forage harvesters are made of martensitic or bainitic hardened and tempered steel and have a cutting wedge with a wear-resistant cutting layer in the form of a hard material coating. When new, the wear-resistant cutting layer lies on the wedge edge and is sintered onto the substrate in the area of a wedge surface. With the aid of this cutting layer, the cutting wedge remains sharp for a long time in the case of purely abrasive stress by the cut material, as in the harvesting of stalky materials such as maize, millet or miscanthus, for example, which are cut off immediately before chopping and are thus not contaminated with coarse foreign bodies located on the ground, whereby a good chopping quality is ensured over a long period of time and a long service life of the blades is achieved.

In these prior art cutting elements, the cutting layer is a hard material coating of a pseudo-alloy consisting of a matrix of a non-ferrous alloy, in particular a nickel-based alloy, with synthetic hard material particles dispersed therein, in particular tungsten cemented carbides, which is applied by a thermal spraying process and subsequently sintered. Due to the different wear resistance of the cutting layer and the substrate, macroscopic selective wear occurs on the cutting wedge as a result of the abrasive cut material in the field. This means that the substrate wears faster in the area of the non-coated wedge surface than the adjacent cutting layer on the coated wedge surface. As a result of the leading material removal on the substrate, the blade-shaped protruding cutting layer creates the self-sharpening effect, which keeps the cutting wedge sharp without regrinding. Such hard-material-coated blades for chopping drums of forage harvesters are described in patent documents EP875323B1 and EP2786651B1, for example.

In the case of the nickel-based alloys usually used as matrix material in the hard material coating according to the prior art, the melting point of the pure nickel of 1455° C. is lowered to 1000 to 1200° C. by alloying in boron and silicon to improve the sinterability of the sprayed-on matrix. At the same time, these melting point lowering alloying elements also give the eutectic solder alloy its self-flowing character and thus ensure better wettability of the substrate and the dispersed foreign synthetic hard material particles. However, the disadvantageous effect of the alloying elements boron and silicon is the formation of brittle intermetallic hard phases, which lead to reduced toughness and increased impact sensitivity of the matrix.

Another disadvantage of the prior art hard material coating is that the sintering temperature, which is adjusted to the low-melting matrix alloy, is below the melting point of the substrate and the hard material particles, and therefore only the matrix is melted during the sintering process, as a result of which both the bonding of the hard material coating to the substrate and the integration of the hard material particles into the matrix only takes place through a very weak material bond via a diffusion fringe along the respective interface.

Due to the above-mentioned disadvantages of the prior art hard material coating, when chopping wilted silage such as grass, alfalfa or clover, which is initially deposited in swaths on the ground after mowing and only picked up for chopping after a certain wilting time, the impact stress on the blades caused by coarse foreign bodies in the cut material such as stones and the like can cause the breaking off of the hard material coating, the detachment of the hard material coating from the substrate and in particular the breaking off of the part of the cutting layer projecting beyond the wedge edge of the substrate as a result of temporary self-sharpening, which results in a rounding of the cutting wedge and deterioration of the chopping quality.

Another problem with the prior art hard material coating is that the heterogeneous material composite of the hard material coating has different material properties than the substrate and thus rapid changes occur in the physical properties at the interfaces. One consequence of this is that micro residual stresses occur during cooling after sintering of the nickel-based alloy of the hard material coating and after tempering of the substrate of tempering steel due to different coefficients of thermal expansion, which can lead to stress cracks both in the hard material coating and in the substrate and, in practical use, to crack-induced fractures of the cutting layer or the entire cutting element.

When chopping wilted silage, the impact stress caused by coarse foreign bodies in the chopped material does not result in sustained self-sharpening of the cutting edge due to macroscopic failure of the cutting layer and thus causes the cutting wedge to become rounded. Furthermore, microscopic abrasive wear on the cutting edge can be caused by fine particles in the chopped material. Since in the prior art hard material coating there is a coarsely dispersed distribution of the hard material particles with a mean free spacing of more than 20 µm, the fine hard particles with particle sizes below 20 µm are presented with large surfaces of attack between the hard material particles. The relatively soft matrix of the hard material coating with a hardness usually below 800 HV is subjected to excessive wear by the hard abrasive particles in the cut material, such as quartz sand with a hardness of about 1000 HV, which leads to washing out of the matrix and dislodging of the hard material particles and thus to failure of the cutting layer by microscopic selective erosion.

SUMMARY

On the basis of this prior art, the object of the present disclosure is to provide a cutting element with a cutting layer resistant to abrasive wear caused by fine particles in the cut material. Furthermore, the cutting layer can be configured to be thin to provide a self-resharpening cutting edge that is defined by wear of a substrate that forms a blade-shaped protrusion that projects beyond the substrate. Furthermore, the cutting layer (in particular, the part of the cutting layer that forms the self-resharpening cutting wedge) can be configured such that it does not break away or detach from the substrate when subjected to impact stress. Furthermore, a cutting device and a forage harvester with the desired cutting element can be provided.

According to the present disclosure, the objects of the present disclosure are provided by a cutting element, characterized in that the cutting layer, which lies predominantly below a first wedge surface, is formed by means of melt-metallurgical modification of the edge zone of the substrate by in-situ precipitation of finely dispersed inherent hard phases from the partially melted edge zone of the substrate.

By forming the cutting layer through modification of the edge zone of the substrate, the substrate can serve as a ductile matrix for the in-situ precipitated and thus metallurgically firmly integrated inherent hard phases so that a homogeneous material composite is produced without pronounced interfaces, rapid changes in the properties and micro residual stresses. The finely dispersed distribution of the hard phases does not present to the fine abrasive particles in the cut material any surfaces of attack between the hard phases of the cutting layer, which prevents the matrix from being washed out and the hard phases from dissolution by microscopic selective erosion.

Inherent hard phases are formed from the melt upon cooling. According to the present disclosure, the formation of the inherent hard phases takes place in the method variant with the melt-metallurgical modification in the form of pure remelting by direct in-situ precipitation of hard-phase-forming alloying elements which are already present in the substrate and in the method variant in the form of remelt alloying by introducing hard-phase-forming alloying elements via an additive material, complete dissolution of the additionally introduced alloying elements in the partially melted edge zone of the substrate and direct in-situ reprecipitation from the melt as intrinsic hard phases in the solidification structure of the edge zone of the substrate. In both method variants, the precipitated inherent (homologous) hard phases produce a homogeneous multiphase alloy structure without distinct interfaces and rapid changes in the properties between the individual metallurgically firmly bonded inherent structural elements (phases). This differs significantly from pseudo-alloys, in which foreign hard materials are added to the melt. In these methods, the foreign (heterologous) hard material particles are introduced into the matrix, whereby a disadvantageous heterogeneous material compound is formed with rapid changes in the properties at the interfaces. The foreign components of the dispersion mixture are connected to each other only by a very weak material bond via diffusion seams at the interfaces.

In embodiments, the cutting element can include a substrate with at least one cutting wedge, which is formed by two wedge surfaces that intersect along a wedge edge. The cutting wedge can include a cutting layer that forms a cutting edge. When new (i.e., as originally formed), the cutting edge lies on the wedge edge and extends over a first wedge surface. The wear resistance of the cutting layer can be greater than the wear resistance of the substrate. Due to lower wear resistance of the substrate, the cutting layer defines a blade-shaped protrusion in the area of a second wedge surface. The blade-shaped protrusion projects beyond the wedge edge and defines a self-resharpening cutting edge which lies predominantly below the first wedge surface. The self-resharpening cutting edge is formed by means of melt-metallurgical modification of the edge zone of the substrate by in-situ precipitation of finely dispersed inherent hard phases from the partially melted edge zone of the substrate.

Furthermore, the present disclosure relates to a method for manufacturing a cutting element, a cutting device and a forage harvester comprising a rotating chopping drum.

Preferably, the cutting element according to the present disclosure is used for cutting off or crushing agricultural goods, in particular as a moving blade on the rotating chopping drum of a forage harvester, which cooperates with a fixed counter-blade.

Advantageously, the wear resistance of the cutting layer is greater than the wear resistance of the substrate by at least 10% and preferably at least 25%, so that the cutting layer, due to leading wear of the substrate, forms, in the area of the second wedge surface, a blade-shaped protrusion, which projects beyond the wedge edge and has a self-resharpening cutting edge. The wear resistance against abrasion can be determined via the friction wheel method according to the ASTM G65 standard.

According to a preferred embodiment, the thickness of the cutting layer is 0.1 to 1.0 mm and particularly preferably 0.2 to 0.6 mm so that the wear-induced protrusion of the cutting layer forms a thin blade-like shape and the cutting layer thereby acts like an exposed protruding cutting material.

In order to specifically counteract localized variable wear of the cutting layer, the thickness of the cutting layer may advantageously vary over the surface of the cutting layer.

In alternative embodiments, the cutting layer comprises only one or multiple partial surfaces of the first wedge surface.

In yet other embodiments, the melt-metallurgical modification of the edge zone of the substrate can be formed by beam-assisted methods. Such beam-assisted methods, e.g. laser beam remelting, are characterized by a high energy density of the beam so that a short exposure time of the high-energy beam for the modification of the edge zone of the substrate is sufficient.

In embodiments, the melt-metallurgical modification of the edge zone of the substrate can be carried out by partially melting the edge zone of the substrate while substantially retaining the geometry of the preformed cutting wedge. This near-net-shape modification of the edge zone of the substrate is made possible by supplying energy via a high-energy beam, which only occurs in areas very close to the surface up to about 1 mm, and offers the advantage that no or very little mechanical reworking of the cutting wedge is required.

In embodiments, the precipitation of the finely dispersed inherent hard phases takes place directly from the partially melted edge zone of the substrate by rapid solidification as a result of self-quenching via rapid heat dissipation into the interior of the substrate.

In embodiments, the finely dispersed inherent hard phases have a micro-hardness of at least 2100 HV and preferably of at least 2800 HV so that the hardness of the abrasive particles in the cut material, such as 1000 HV in the case of quartz sand, is clearly exceeded and thus an excessive wear of the cutting layer is avoided.

Further, the finely dispersed inherent hard phases may advantageously have a volume fraction of at least 5% and preferably of at least 10% in the cutting layer.

In other embodiments, the cutting layer can have a graded layer structure.

In still other embodiments, the volume fraction of the finely dispersed inherent hard phases in the cutting layer can vary.

In embodiments, he finely dispersed inherent hard phases can have a mean free spacing of less than 20 µm, and preferably less than 10 µm, has the advantage that the fine abrasive particles in the cut material are not presented with a surface of attack between the hard phases of the cutting layer.

In embodiments, the finely dispersed inherent hard phases can be carbides, borides, nitrides or oxides, preferably monocarbides such as vanadium, titanium or niobium carbides.

In other embodiments, the melt-metallurgical modification of the edge zone of the substrate can be carried out by introducing a powdery filler material, which preferably contains a monocarbide-forming refractory alloying element such as vanadium, titanium or niobium. In the local melt bath of the partially melted edge zone of the substrate, the introduced filler material is completely dissolved and, due to rapid solidification as a result of self-quenching via rapid heat dissipation into the interior of the substrate, uniformly finely dispersed monocarbide phases, which are firmly integrated into the matrix metal phase of the substrate, precipitate. The high solubility of the refractory alloying elements in the melt contrasts with a low solubility in the solid state so that solidification leads to good precipitation of the hard phases. A microcrystalline solidification structure is formed with a uniform finely dispersed distribution of monocarbide precipitates in a tough martensitic or bainitic steel matrix, which improves the wear resistance of these hard phase precipitates. The morphology, size, distribution and hardness of the monocarbides, together with the ductile steel matrix, result in an alloy system that exhibits extreme impact strength and the highest wear resistance.

The present disclosure also relates to a method for manufacturing a cutting element as described above, comprising the steps of
- mechanically processing the substrate with near-net-shape preforming of at least one cutting wedge, which is formed by two wedge surfaces that intersect along a wedge edge; and
- forming a wear-resistant cutting layer, which starts at the wedge edge and lies predominantly below the first wedge surface, by means of melt-metallurgical modification of the edge zone of the substrate by in-situ precipitation of finely dispersed inherent hard phases of the substrate.

In embodiments, a powdery filler material (preferably containing a monocarbide-forming refractory alloying element, such as vanadium, titanium or niobium) can be introduced for the melt-metallurgical modification of the edge zone of the substrate.

In embodiments, the melt-metallurgical modification of the edge zone of the substrate can be carried out continuously along the wedge edge by means of a high-energy beam.

In embodiments, the melt-metallurgical modification of the edge zone of the substrate can be performed in areas close to the surface to a depth of about 1 mm while substantially retaining the geometry of the preformed cutting wedge.

Furthermore, the present disclosure relates to a cutting device using one or more cutting elements, wherein at least one or more cutting elements are arranged on a chopping drum and wherein a fixed counter-blade is provided for cooperating with the moving cutting elements.

Furthermore, the present disclosure relates to a forage harvester with a rotating chopping drum, wherein a plurality of cutting elements is arranged on the chopping drum and wherein at least one fixed counter-blade is provided for cooperating with the moving cutting elements.

BRIEF DESCRIPTION OF THE DRAWINGS

In the following, the present disclosure describes embodiments of a cutting element by way of example with reference to schematic drawings of a blade for the chopping drum of a forage harvester.

DETAILED DESCRIPTION OF THE PREFERRED EMBODIMENTS

Figure 1:
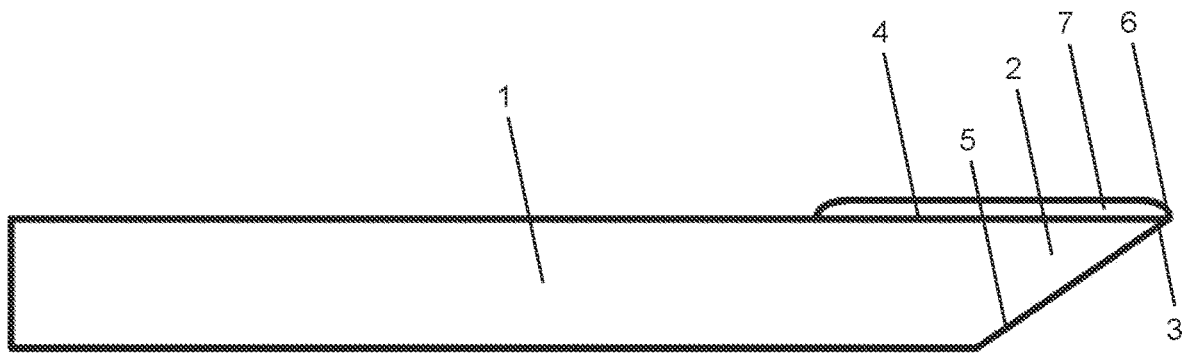
FIG. 1 shows a side view of a prior art blade.

In FIG. 1, a new prior art flat blade for the chopping drum of a forage harvester is schematically shown in a side view. The blade made of a substrate 1 of martensitic or bainitic steel usually has a thickness of 5 to 15 mm, a width of 50 to 150 mm, a length of 150 to 450 mm and, in addition to the flat shape shown, can also be designed in a spatially curved shape. Furthermore, the blade has recesses in the substrate area outside the cutting wedge 2 for being fastened to the blade carriers of the chopping drum by means of fastening elements, which are omitted for the sake of a clearer representation. The cutting function of the blade is performed by an acute-angled cutting wedge 2, which has a wedge edge 3 and is enclosed by a first wedge surface 4 and a second wedge surface 5. When new, the cutting edge 6 extends along the wedge edge 3 and is part of the cutting layer 7, which is applied to the first wedge surface 4 in the form of a hard material coating by a thermal spraying process and is subsequently sintered by means of a flame, inductively or in a furnace. In prior art blades, the hard material coating has a thickness of 0.2 to 0.6 mm and a width of 10 to 30 mm.

Figure 2:
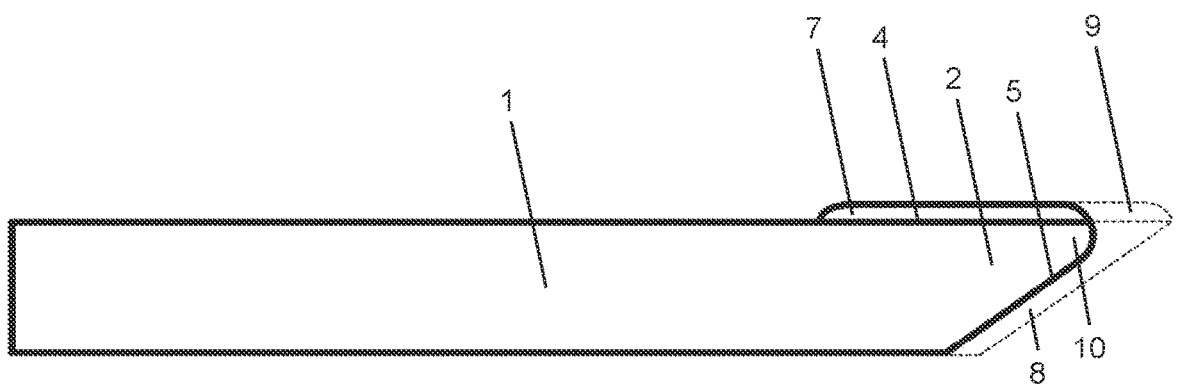
FIG. 2 shows the wear of a prior art blade during use in a side view.

As can be seen in the schematic side view of a prior art blade for the chopping drum of a forage harvester during use in FIG. 2, the impact stress caused by coarse foreign bodies in the cut material leads, as a result of the disadvantages of the prior art design of the cutting layer 7 already described, to failure of the cutting layer 7 by breaking away of the cutting layer 7, detachment of the cutting layer 7 from the wedge surface 4 of the substrate 1 and breaking off of the protrusion 9 of the cutting layer 7, which temporarily projects beyond the substrate 1 in the area of the second wedge surface 5 due to leading wear 8 of the substrate 1, and thus to rounding 10 of the cutting wedge 2. This rounding 10 of the cutting wedge 2 results in a significant deterioration of the cutting quality and a massive increase in fuel consumption. In order to remove the rounding 10 of the cutting wedge 2, frequent regrinding of the second wedge surface 5 is necessary and with the associated material removal on the cutting wedge 2, the service life of the blade is significantly shortened.

Figure 3:
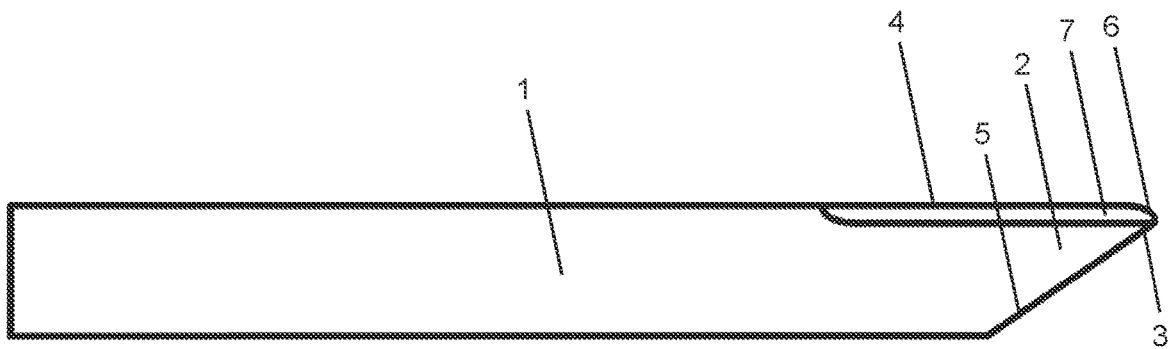
FIG. 3 shows a side view of a blade according to the present disclosure.

FIG. 3 shows a schematic representation of an exemplary embodiment of the present disclosure in the form of a new blade for the chopping drum of a forage harvester in a side view. As in the prior art blade, the steel substrate 1 has a cutting wedge 2, whose wedge surfaces 4 and 5 form the wedge edge 3, which in turn supports the cutting edge 6. In contrast to the prior art blade, however, the cutting layer 7 extending from the cutting edge 6 lies predominantly below the first wedge surface 4 and the cutting layer 7 embedded in the substrate 1 is formed by means of melt-metallurgical modification of the edge zone of the substrate 1 by in-situ precipitation of finely dispersed inherent hard phases from partial melting of the edge zone of the substrate 1. The partial melting of the edge zone of the substrate 1 is carried out while essentially retaining the geometry of the pre-formed cutting wedge 2. This near-net-shape modification of the edge zone of the substrate is made possible in particular by supplying energy via a high-energy beam, which only takes place in areas very close to the surface up to about 1 mm, and offers the advantage that no or only very little mechanical reworking of the cutting wedge is required.

Figure 4:
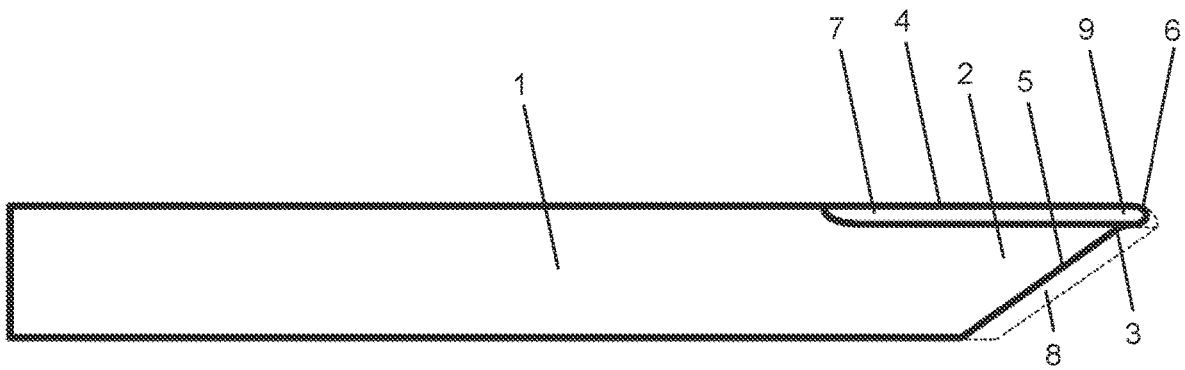
FIG. 4 shows the wear of a blade according to the present disclosure during use in a side view.

FIG. 4 shows a side view of the advantageous wear pattern of a blade according to the present disclosure during use. As a result of the advantages of the design of the cutting layer 7 as described herein, the cutting layer 7, which starts at the cutting edge 6, is embedded in the substrate 1 and lies predominantly below the first wedge surface 4, does not break out or detach from the wedge surface 4 of the substrate 1 when subjected to impact stress by coarse foreign bodies in the cut material. Instead, due to leading wear 8 of the substrate 1, in the area of the second wedge surface 5, a blade-shaped protrusion 9 forms, which projects beyond the wedge edge 3 of the cutting wedge 2 and has a self-resharpening cutting edge 6. Due to the advantageous material properties of the design according to the present disclosure, the blade-shaped protrusion 9 of the cutting layer 7 does not break off even when subjected to impact stress by coarse foreign bodies in the cut material. Due to the lasting self-sharpening effect made possible by this, the frequency of regrinding on the second wedge surface 5 can be significantly reduced and the service life of the blade extended accordingly.

There have been described and illustrated herein several embodiments of a cutting element and a method of forming same. While particular configurations have been disclosed in reference to the cutting element, it will be appreciated that other configurations could be used as well. It will therefore be appreciated by those skilled in the art that yet other modifications could be made to the provided invention without deviating from its spirit and scope as claimed. Thus, the invention is not limited to the exemplary embodiment shown, but can be applied generally to cutting elements for cutting abrasive cut material that is subjected to impact stress.

LIST OF REFERENCE SIGNS

1 Substrate
2 Cutting wedge
3 Wedge edge
4 First wedge surface
5 Second wedge surface
6 Cutting edge
7 Cutting layer
8 Wear of the substrate
9 Protrusion of the cutting layer
10 Rounding of the cutting wedge

The invention claimed is:

1. A cutting element, comprising:
a substrate that defines at least one cutting wedge which is formed by first and second wedge surfaces that intersect along a wedge edge, wherein the first wedge surface has a first part disposed adjacent the wedge edge and a second part spaced from the wedge edge; and
a cutting layer that extends over the first part of the first wedge surface and extends below the second part of the first wedge surface, wherein the cutting layer has a first configuration and a second configuration, wherein the first configuration defines a cutting edge which lies on the wedge edge when new, and wherein the second configuration defines a blade-shaped protrusion that projects beyond the wedge edge due to wear of the substrate in the area of the second wedge surface to provide a self-resharpening cutting edge;
wherein wear resistance of the cutting layer is greater than wear resistance of the substrate; and
wherein the cutting layer or part thereof is formed by means of melt-metallurgical modification of an edge zone of the substrate by in-situ precipitation of finely dispersed inherent hard phases from partial melting of the edge zone of the substrate.

2. A cutting element according to claim 1, wherein:
the cutting element is configured to cut abrasive material.

3. A cutting element according to claim 1, wherein:
the wear resistance of the cutting layer is greater than the wear resistance of the substrate by at least 10%; or
the wear resistance of the cutting layer is greater than the wear resistance of the substrate by at least 25%.

4. A cutting element according to claim 1, wherein:
the thickness of the cutting layer is 0.1 to 1.0 mm; or
the thickness of the cutting layer is 0.2 to 0.6 mm.

5. A cutting element according to claim 1, wherein:
thickness of the cutting layer varies across the surface of the cutting layer.

6. A cutting element according to claim 1, wherein:
the cutting layer comprises only one or multiple partial surfaces of the first wedge surface.

7. A cutting element according to claim 1, wherein:
the edge zone of the substrate is subjected to a beam-assisted melt-metallurgical modification.

8. A cutting element according to claim 1, wherein:
the edge zone of the substrate is melt-metallurgically modified by partial melting of the edge zone of the substrate while substantially retaining the geometry of the cutting wedge.

9. A cutting element according to claim 1, wherein:
the edge zone of the substrate is melt-metallurgically modified by precipitating the finely dispersed inherent hard phases directly from the partially melted edge zone of the substrate and rapid solidification as a result of self-quenching via rapid heat dissipation into the interior of the substrate.

10. A cutting element according to claim 1, wherein:
the finely dispersed inherent hard phases have a microhardness of at least 2100 HV; or
the finely dispersed inherent hard phases have a microhardness of at least 2800 HV.

11. A cutting element according to claim 1, wherein:
the finely dispersed inherent hard phases have a volume fraction of at least 5% in the cutting layer; or
the finely dispersed inherent hard phases have a volume fraction of at least 10% in the cutting layer.

12. A cutting element according to claim 1, wherein:
the finely dispersed inherent hard phases have a volume fraction that varies in the cutting layer.

13. A cutting element according to claim 1, wherein:
the finely dispersed inherent hard phases have a mean free distance of less than 20 μm; or
the finely dispersed inherent hard phases have a mean free distance of less than 10 μm.

14. A cutting element according to claim 1, wherein:
the finely dispersed inherent hard phases comprise carbides, borides, nitrides or oxides.

15. A cutting element according to claim 1, wherein:
the finely dispersed inherent hard phases comprise monocarbides of a refractory alloying element.

16. A cutting element according to claim 15, wherein:
the refractory alloy element comprises vanadium, titanium or niobium carbides.

17. A cutting element according to claim 1, wherein:
the melt-metallurgical modification of the edge zone of the substrate involves introducing a powdery filler material.

18. A cutting element according to claim 17, wherein:
the powdery filler material comprises a monocarbide-forming refractory alloying element.

19. A cutting element according to claim 1, wherein:
the substrate comprises a steel alloy containing at least one carbide-forming alloy element.

20. A cutting element according to claim 19, wherein:
the at least one carbide-forming alloy element comprises vanadium, titanium, niobium or chromium.

21. A cutting device, comprising:
a chopping drum with at least one cutting element according to claim 1; and
a fixed counter-blade that cooperates with the at least one cutting element.

22. A forage harvester, comprising:
a rotating chopping drum with at least one cutting element according to claim 1; and
a fixed counter-blade that cooperates with the at least one cutting element.

\* \* \* \* \*